(12) United States Patent
Gordecki (10) Patent No.: US 7,111,362 B2
(45) Date of Patent: Sep. 26, 2006

(54) ELECTRONICS DEVICES WITH SPRING BIASED HINGES AND METHODS THEREFOR

(75) Inventor: Ryszard Gordecki, Green Oaks, IL (US)

(73) Assignee: Motorola, Inc., Schaumburg, IL (US)

(*) Notice: Subject to any disclaimer, the term of this patent is extended or adjusted under 35 U.S.C. 154(b) by 34 days.

(21) Appl. No.: 10/170,765

(22) Filed: Jun. 13, 2002

(65) Prior Publication Data

US 2004/0166890 A1     Aug. 26, 2004

(51) Int. Cl.
*E05F 1/08* (2006.01)
*E05D 11/08* (2006.01)

(52) U.S. Cl. .................... 16/303; 16/341; 361/681; 361/682; 379/433.13

(58) Field of Classification Search .......... 16/303–308, 16/312, 337, 341, 342, 330; 403/118–120, 403/83.84; 379/433.13; 261/680, 681, 801, 261/802, 803
See application file for complete search history.

(56) References Cited

U.S. PATENT DOCUMENTS

| | | | | |
|---|---|---|---|---|
| 4,948,103 A | * | 8/1990 | Bowden et al. | 267/34 |
| 5,165,145 A | * | 11/1992 | Sherman | 16/341 |
| 5,467,504 A | * | 11/1995 | Yang | 16/342 |
| 5,629,979 A | | 5/1997 | Domoleczny | |
| 5,640,690 A | | 6/1997 | Kudrna | |
| 5,649,309 A | | 7/1997 | Wilcox et al. | |
| 5,704,094 A | | 1/1998 | Hartigan et al. | |
| 5,732,135 A | * | 3/1998 | Weadon et al. | 379/433.13 |
| 5,761,300 A | | 6/1998 | Domoleczny | |
| 5,987,122 A | * | 11/1999 | Daffara et al. | 379/433.13 |
| 6,104,621 A | * | 8/2000 | Weadon et al. | 361/814 |
| 6,115,886 A | * | 9/2000 | Fujita | 16/330 |
| 6,125,509 A | | 10/2000 | Hartigan et al. | |
| 6,321,415 B1 | * | 11/2001 | Frohlund | 16/330 |
| 6,459,887 B1 | * | 10/2002 | Okuda | 455/90.1 |
| 6,493,542 B1 | * | 12/2002 | Frohlund | 455/90.1 |
| 6,505,382 B1 | * | 1/2003 | Lam et al. | 16/325 |
| 6,510,588 B1 | * | 1/2003 | Eromaki | 16/308 |
| 6,530,121 B1 | * | 3/2003 | Hayashi | 16/330 |
| 6,530,122 B1 | * | 3/2003 | Kondou et al. | 16/335 |
| 6,678,539 B1 | * | 1/2004 | Lu | 455/575.1 |
| 2002/0078529 A1 | * | 6/2002 | Schwarz | 16/387 |

FOREIGN PATENT DOCUMENTS

| | | |
|---|---|---|
| EP | 0 713 313 B1 | 9/2001 |
| GB | 2 299 371 A | 10/1996 |
| GB | 2 392 206 A | 2/2004 |

* cited by examiner

OTHER PUBLICATIONS

"One Touch Open Hinge" and "Damper Hinge" referenced at www.strawberrycorporation.com/products/en_index.html, Strawberry Corporation, Jun. 13, 2002, one page.

*Primary Examiner*—Robert J. Sandy
*Assistant Examiner*—Andre' L. Jackson
(74) *Attorney, Agent, or Firm*—Roland K. Bowler, II (57) ABSTRACT

A hinged panel (110) coupled to a body member (120), for example in a wireless communications device, including a torsion spring (150) coupled to the body member and to the panel, a cam (127) coupled to the body member, a follower (134) coupled to the panel. A decreasing counter-torque is applied to the panel by the spring biased cam and follower assembly when the torsion spring torque is above a specified level, and an increasing assisting-torque is applied to the panel by the spring biased cam and follower assembly when the torsion spring torque is below a specified level.

27 Claims, 5 Drawing Sheets

ELECTRONICS DEVICES WITH SPRING BIASED HINGES AND METHODS THEREFOR

FIELD OF THE INVENTIONS

The present inventions relate generally to electronics devices having spring biased hinges, and more particularly to electronics handsets having hinged panels, for example mobile wireless communications handsets, spring biasing mechanisms, and methods therefor.

BACKGROUND OF THE INVENTIONS

Wireless cellular communications devices having hinged flip portions are known generally. U.S. Pat. No. 5,640,690 entitled "Hinged Assembly Having Cam Follower" and U.S. Pat. No. 5,704,094 entitled "Electronic Device Having A Cam Assembly Functioning As A Depressible Hinge" both disclose, for example, a compression spring biased cam that engages a cam follower to pivotal a body member cover or flip portion.

The Strawberry Corporation sells a "One Touch Open Hinge" for cellular telephones with a spring biased hinged display panel. The Strawberry hinge includes a torsion spring that pivots open the hinged display panel, and a compression spring that biases a detent into a recess to maintain the display panel in a closed position. The Strawberry Corporation also sells a "Damper Hinge" for slowing the opening of a hinged panel in cellular phones and video devices.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
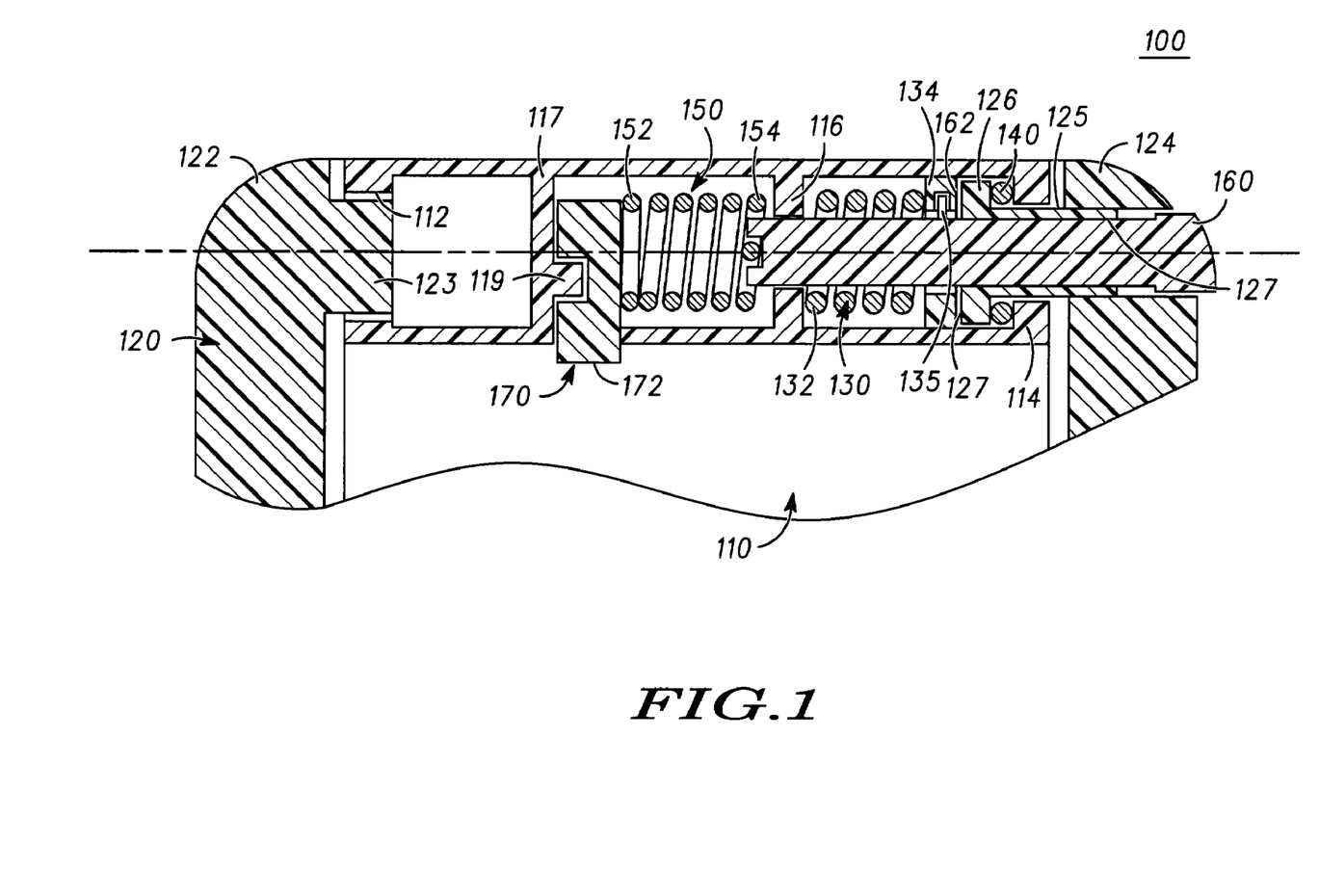
FIG. 1 is an exemplary electronics device having a hinged panel.

FIG. 1 illustrates an exemplary electronics device 100 having a panel 110, for example a cellular phone flip, pivotally coupled to a body member 120, for example to a cellular handset housing. In the exemplary embodiment, the electronics device is a wireless communications handset. However, the hinges and spring biasing mechanisms of the present inventions may be used more generally in any application where it is desire to provide a spring-biased hinge, as will become more fully apparent from the discussion below.

Figure 2:
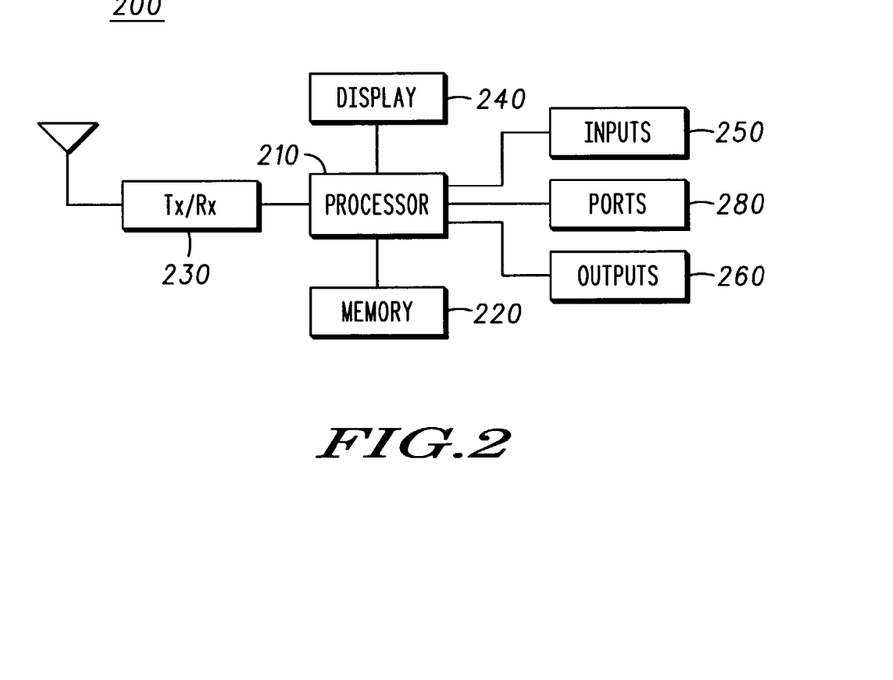
FIG. 2 is an exemplary wireless communications device.

FIG. 2 is an exemplary wireless communications handset schematic block diagram 200 comprising generally a processor 210 coupled to memory 220, for example RAM, ROM, EPROM, etc. The exemplary wireless handset also includes a radio transceiver 230, a display 240, inputs 250, for example a keypad, a microphone and video inputs, outputs 260, for example a sound and tactile outputs, and other ports 270, for example power, audio, etc., all of which are coupled to the processor.

The various elements of the exemplary wireless handset, for example the processor, memory, inputs, outputs are disposed generally in a housing. The display is often mounted on the housing or on a hinged flip, which may also include a keypad. The location and arrangement of these exemplary wireless handset elements is only an exemplary application and is immaterial to the structure of the hinges and spring biasing mechanisms, which are discussed more fully below.

In FIG. 1, the exemplary body member 120 includes first knuckle 122 having a protruding first support member 123 disposed pivotally in an opening 112 of the panel 110. The body member 120 also includes a second knuckle 124 having a protruding second support member 125 also disposed pivotally in an opening of the panel. The panel is pivotal about a common pivot axis extending through the first and second support members. In other embodiments, the panel may be coupled to the housing by alternative pivotal coupling schemes, for example by a common pivot member or shaft.

In one embodiment, in FIG. 1, the second support member 125 is rotationally fixed relative to the second knuckle 124 of the body member but is capable of axial reciprocation along the pivot axis relative to the knuckle, for example by providing a slot and key coupling between the second support member 125 and an opening 127 in the knuckle. The second support member 125 is reciprocatably and rotatably disposed within the opening of the panel 110.

In one embodiment, a compressed spring compresses a resilient member between a portion of the body member and a portion of the panel to provide frictional drag between the body member and the panel as the panel is opened under the bias of a compression spring or torsion spring or both, examples of which are discussed more fully below. In one embodiment, the frictional drag, or dampening effect, of the resilient member varies in some proportion to the angular rotation of the panel.

In FIG. 1, a resilient member 140, for example an o-ring, is disposed between a flange 126 of the body member 120 and a flange portion 114 of the panel 110. The resilient member may be a rubber or synthetic material. A spring 130 is disposed in compression between the flange 126 and a flange 116 of the panel. The compression spring urges the flange 126 axially toward the panel flange 114, between which the resilient member 140 is compressed, thus providing a frictional engagement that dampens pivotal action of the panel relative to the body member. In the exemplary embodiment, the flange 126 is formed integrally with the second support member 125, but in other embodiments, the flange 126 may be a discrete member, or it may be coupled to the panel or the compression spring 130 or both.

In one embodiment, the panel 110 is pivoted relative to the body member 120 by a compression-spring biased cam and follower assembly. In FIG. 1, for example, the flange 126 includes a cam surface 127. A cam follower 134 is disposed between the compressed spring 130 and the flange 126. The cam follower 134 is fixed rotationally relative to the panel, but is capable of reciprocation along the spring axis. The flange 126 is fixed rotationally relative to the body member. In operation, the compressed spring 130 urges the follower 134 into engagement with the cam surface of the flange 126, thereby rotating the panel relative to the body member as the follower follows the cam surface under the bias of the compression spring.

In embodiments where the resilient member 140 is used in combination with the compression spring 130, the resilient member reduces the torque applied to the panel by the compression spring by providing a frictional drag that is related in some manner to the spring force. Particularly, when the panel is closed and opening initially, the compression spring applies the greatest compression force on the resilient member, which provides the greatest dampening. As the spring force decreases, upon opening of the panel, the compression, and thus the dampening, of the resilient member is correspondingly reduced. The panel opening torque is thus dampened in proportion to the force of the compression spring.

Figure 3:
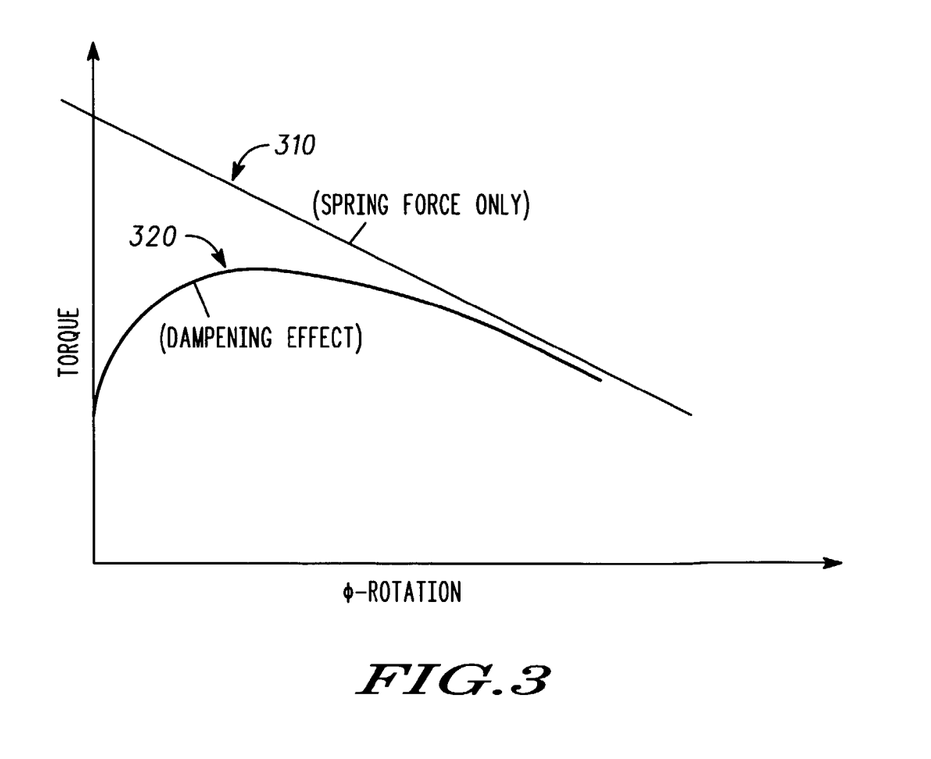
FIG. 3 is an exemplary torque versus rotation angle relationship.

FIG. 3 is a graphical illustration of the torque applied to the panel by the compression spring biased cam and follower assembly when dampened by the resilient member versus the angle of rotation. The upper straight-line plot 310 illustrates the torque applied by the compression spring biased cam and following assembly only. The lower, curved plot 320 illustrates the dampening effect of the resilient member on the torque. When the panel is closed, the spring force and dampening effects are greatest. As the panel opens and the spring force decreases, the dampening decreases correspondingly. In the exemplary embodiment, the dampened torque is relatively constant, or at least within a relatively narrow torque range, in comparison to the torque of compression spring-biased cam and follower only, thus providing a relatively constant rate of panel rotation, which is desirable in some applications.

In one embodiment, the cam of the compression spring-biased cam and follower assembly has a cam surface that provides a comparatively constant panel pivoting torque. Preferably, the cam surface has a slope that increases in proportion to the decreasing spring force of the compression spring, thereby providing a relatively constant panel opening torque.

Figure 4:
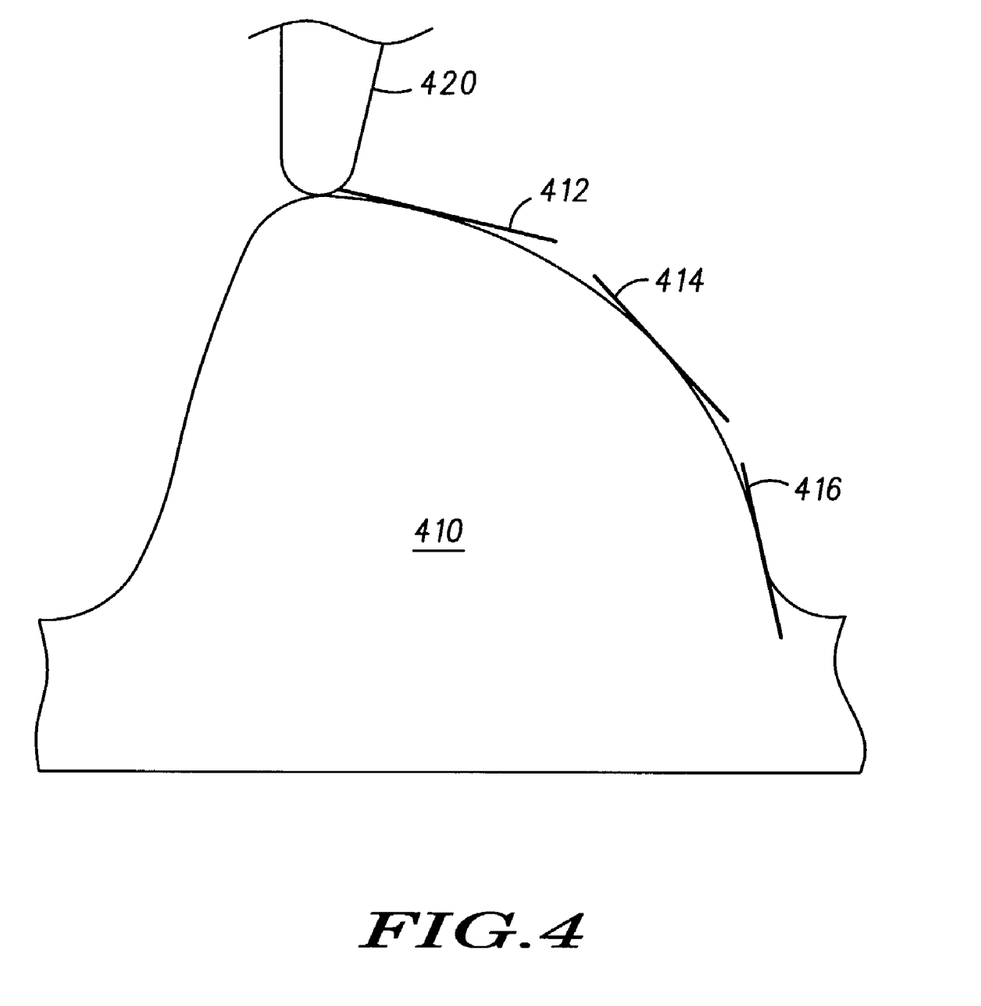
FIG. 4 illustrates an exemplary cam surface schematic.

FIG. 4 illustrates a cam 410 and follower 420 assembly. The cam has a cam surface with an increasing slope, indicated by several tangential line portions 412, 414 and 416. When the compression spring force is relatively strong, the follower 420 follows the relatively shallow sloping cam surface portions, which result in less rotation of the follower. The follower follows increasingly steep portions of the cam surface as the spring force weakens, thus increasingly rotating the follower with decreasing spring force. The shallower portions of the cam surface impart less rotation to the panel than do the steeper cam surface portions, thus compensating for the weakening spring force. The variable sloping cam surface may be used in combination with the resilient member for dampening the effect of the compression spring.

In FIG. 1, an energy storing torsion spring 150 is coupled to the panel 110 and to the body member 120, whereby the torsion spring pivots the panel about the pivot axis. In the exemplary embodiment, one end 152 of the torsion spring is coupled to a portion 117 of the panel and another end 154 of the torsion spring is coupled to the body member 120 by the second support member 125. In the exemplary embodiment, a pushbutton release member 160 interconnects the torsion spring 150 and the support member 125. The exemplary pushbutton 160 is movable axially relative to the support member 125, but does not rotate relative to the support member 125 or the body member 120, as discussed further below. In other embodiments, the support member 125 may include a unitary portion extending toward the torsion spring for engagement therewith, without the exemplary pushbutton.

In some embodiments, the torsion spring may be the sole means for pivoting the panel relative to the housing. In other embodiments, the torsion spring is used in combination with a compression spring wherein the compression spring functions to compress the resilient member between portions of the panel and body member, without functioning to impart torque to the panel. In other embodiments, both the torsion spring and the compression spring impart torque to the panel, with or without dampening by the resilient member.

In one embodiment, the compression spring biased cam and follower assembly initially produces a counter-torque that subtracts from, or dampens, the initial opening torque produced by the torsion spring. As panel opening torque from the torsion spring decreases below some torque level, the compression spring biased cam follower assembly produces an assisting-torque that adds to the opening torque produced by the torsion spring.

Figure 5:
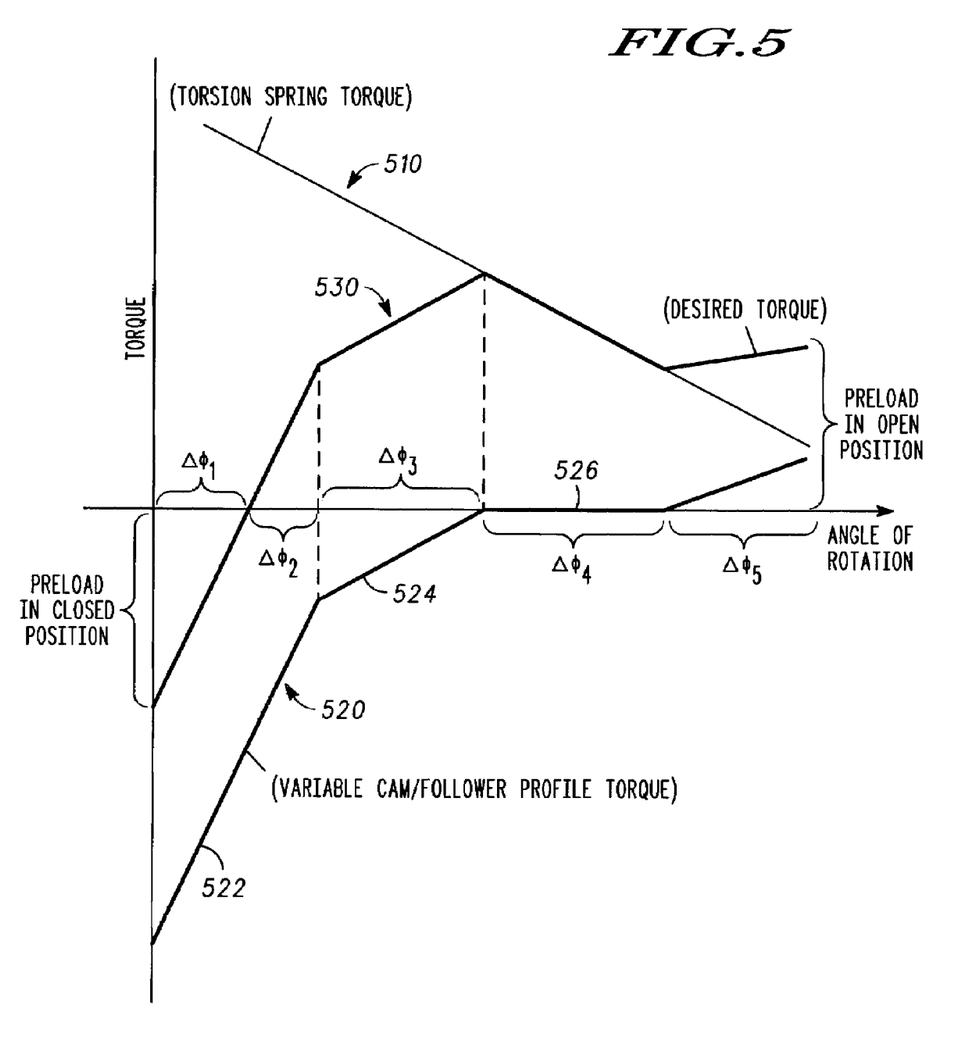
FIG. 5 is another exemplary torque versus rotation angle relationship.

FIG. 5 is a graphical illustration of the opening torque applied to the panel by both the torsion spring and the compression spring biased cam and follower versus the angle of panel rotation. The upper straight-line plot 510 illustrates the torque applied by the torsion spring only. The lower plot 520 illustrates the torque applied to the panel by the compression spring biased cam and follower assembly only. The desired torque, represented by an intermediate plot 530, is a summation of the torsion spring torque and the cam and follower assembly torque. Generally, when the panel is closed, a negative pre-load torque, indicated by line segment 532, is applied to the panel tending to close it relative to the housing.

In FIG. 5, the negative pre-load torque is overcome by rotating the panel through an angle deltPhi1, upon which an increasingly positive torque indicated by line segment 534 is applied to the panel, thereby rotating the panel open. The negative pre-load torque may be overcome by manually rotating the panel against the negative bias of the cam and follower. The negative pre-load torque may be overcome by momentarily disengaging the follower from the cam, for example upon depressing a pushbutton, while the torsion spring rotates the panel through the angle deltPhi1.

Figure 6:
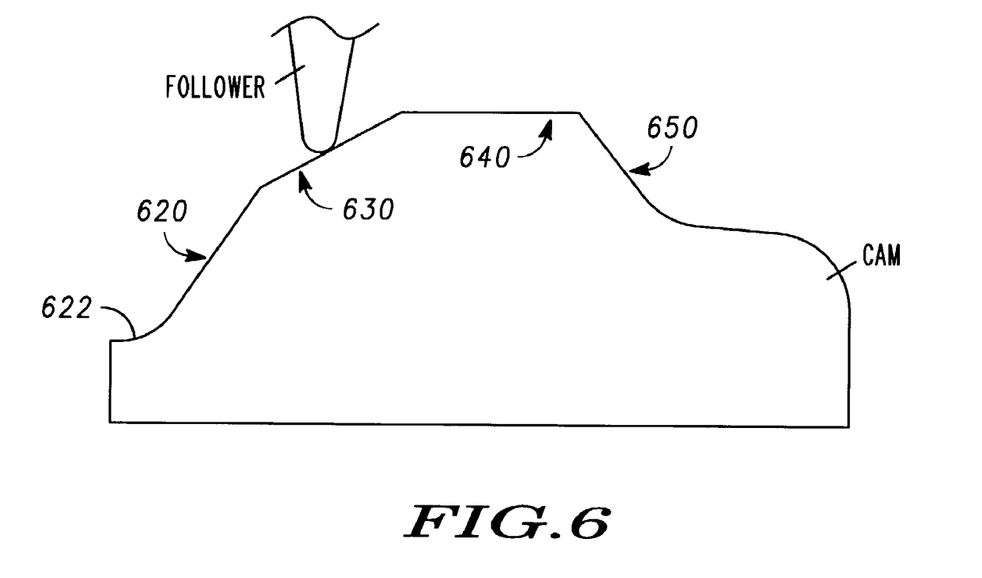
FIG. 6 illustrates another exemplary cam surface schematic.

FIG. 6 illustrates an exemplary cam 610 having a cam surface for providing the compression spring biased cam and follower counter-torque plot 530 in FIG. 5. In FIG. 6, the follower 610 is located at point 622 when the panel is closed. Movement of the follower along cam surface 620 corresponds to rotation of the panel through an angle deltPhi1+deltPhi2 in FIG. 5, and produces the cam and follower torque characteristic of line segment 522 in FIG. 5.

In FIG. 6, movement of the follower along cam surface 630 corresponds to rotation of the panel through an angle deltPhi1+deltPhi2+deltPhi3 in FIG. 5, and produces the cam and follower torque characteristic of line segment 524 in FIG. 5. In FIG. 6, movement of the follower along cam surface 640 corresponds to rotation of the panel through an angle deltPhi1+deltPhi2+deltPhi3+deltPhi4 in FIG. 5, and produces the cam and follower torque characteristic of line segment 526 in FIG. 5. In FIG. 6, movement of the follower along cam surface 650 corresponds to rotation of the panel through an angle deltPhi1+deltPhi2+deltPhi3+deltPhi4 in FIG. 5, and produces the cam and follower torque characteristic of line segment 526 in FIG. 5. When the panel is open, there is a pre-load on the panel that tends to keep the panel open.

In one embodiment, the torsion spring is adjustably biased to increase or decrease the torque applied to the pivotal panel. In FIG. 1, a spring biasing member 170 interconnects the first end 152 of the torsion spring and the panel portion 117. The spring biasing member 170 is rotatably coupled to the panel by a pin 119. The rotation axis of the spring biasing member is substantially parallel and offset relative to the axis of the torsion spring 150. The spring biasing member has an outer portion 172, which may be knurled to improve gripping, exposed through an opening of the panel. Rotation of the spring biasing member one way or the other coils or uncoils the torsion spring. The misalignment of the rotation axis 119 of the spring biasing member relative to the axis of the torsion spring 150 prevents uncoiling of the torsion spring. In other embodiments, the bias of the torsion spring is not adjustable.

In another embodiment, the compression spring is adjustably biased to increase and decrease the torque applied to the pivotal panel. A spring biasing member may be adjustably disposed between one end 132 of the compression spring and the panel portion 116. In one embodiment, the spring biasing member includes a threaded nut adjustably positioned along a threaded shaft parallel to the spring axis. Movement of the nut along the threaded shaft either compresses or decompresses the compression spring 130. In other embodiments, the bias of the compression spring is not adjustable.

In FIG. 1, the pushbutton release member 160 interconnecting the torsion spring 150 and the support member 125 is movable axially against the bias of the torsion spring upon compression thereof. The pushbutton 160 is disposed through an opening in the support member 125 and flange 126, and through the compression spring 130. The pushbutton is thus free to move axially through both the support member 125 and flange 126 thereof upon depressing the pushbutton and compressing the torsion spring 150. The pushbutton is rotationally fixed relative to the body member by rotationally fixing the pushbutton within the support member 125, for example by providing an eccentric sectional shape or a slot/key relationship. At the same time, the second support member 125 and flange 126 are free to move axially relative to the panel 110 and the body member under the bias of the compression spring 130.

In the exemplary embodiment, the push button 160 comprises an engagement member, for example a pin 162, that engages a corresponding annular or partially slot 135 formed in an opening through the follower 134. The pushbutton 160 is thus free to rotation relative to the follower 134 but is capable of moving the follower axially away from the cam upon depression of the pushbutton. The follower is keyed or otherwise rotationally fixed relative to the panel so that the two rotate in unison. In one embodiment, depression of the push button 160 moves the follower 134 away from the cam, thereby permitting the torsion spring to rotate the panel as discussed above.

In some embodiments, the panel and body member may be fastened against a positive opening bias of the torsion spring or the compression spring or both by a latching mechanism, which when release allows the panel to rotate open.

Figure 7:
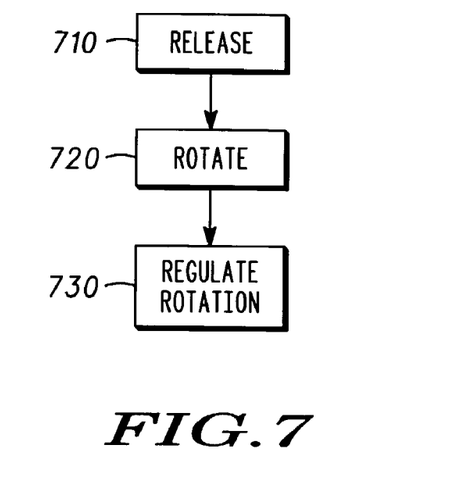
FIG. 7 illustrates an exemplary process flow diagram.

In the process flow diagram of FIG. 7, at block 710, in embodiments that include a latching mechanism, the panel released from the body member, for example by depressing the exemplary pushbutton. Upon or after releasing the panel, at block 720, the panel is pivoted or rotated, for example from a closed position to an open position. In one embodiment, the panel rotates by applying a torque thereto. The torque may be applied, for example, by a torsion spring or a compressed spring biased cam and follower assembly or by both a torsion spring and a compression spring biased cam and follower assembly. The rotating step is not limited however to the particular exemplary hinge rotation embodiments disclosed herein.

In FIG. 7, at block 730, the rotation rate of the panel is regulated, for example to provide a relatively constant rotation speed. In one embodiment, the rotation rate is regulated by variably dampening the torque applied to the panel with increasing angular rotation of the panel. In a more particular embodiment, the torque is decreasingly dampened with increasing angular rotation of the panel by decreasingly compressing a friction generating resilient member compressed between portions of the panel and body member. Other dampening schemes may be used alternatively.

In another embodiment, the rotation rate of the panel is regulated by decreasingly decreasing the torque applied to the panel with increasing angular rotation of the panel at least during a portion of angular rotation, for example during the initial opening phase of the panel when the spring force is most strong. The rotation rate of the panel may also be regulated by increasingly increasing the torque applied to the panel with increasing angular rotation of the panel at least during another portion of angular rotation, for example toward the end of the rotation when the spring force begins to weaken.

In a more particular embodiment, the panel pivots by applying a torque thereto with a torsion spring. The torque applied to the panel is decreasingly decreased by applying a decreasing counter-torque to the panel with a spring biased cam and follower when the torsion spring torque is above a specified level. A friction generating resilient member may also be used, along or in combination with the cam and follower, to dampen the torque when the spring force is above the specified level. The torque applied to the panel is increasingly increased by applying an increasing assisting-torque to the panel with the spring biased cam and follower when the torsion spring torque is below a specified level. These and other exemplary rotation speed regulating features may also be used in combination.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A wireless communication device, comprising:
   a body member;
   a panel pivotally coupled to the body member, the panel movable between opened and closed positions relative to the body member;
   a spring-biased cam and follower assembly,
   a cam of the spring-biased cam and follower assembly having a first cam surface with a first slope, the cam having a second cam surface with a second slope, the first slope less than the second slope, the cam coupled to one of the panel or the body member;
   a follower of the spring-biased cam and follower assembly coupled to the one of the panel or the body member to which the cam is not coupled;

a compression spring of the spring-biased cam and follower assembly having higher energy when the panel is in the closed position and lower energy when the panel is in the opened position, the follower coupled with the first cam surface when the compression spring has higher energy, the follower coupled with the second cam surface when the compression spring has lower energy.

2. The device of claim 1, a resilient member disposed between a portion of the panel and the one of the cam or the follower coupled to the body member, the resilient member aligned substantially axially with the compression spring, the resilient member compressed between the cam or the follower and the portion of the panel by the compression spring.

3. The device of claim 1, a torsion spring coupled to the body member, the torsion spring coupled to the panel, an axis of the torsion spring substantially parallel to an axis of the compression spring.

4. The device of claim 3, a spring biasing member rotatably coupled to the body member, the spring biasing member interconnecting the torsion spring and the panel, a rotation axis of the spring biasing member substantially parallel with an axis of the torsion spring, the rotation axis of the spring biasing member not aligned with the axis of the torsion spring.

5. The device of claim 3, a push button disposed axially through the compression spring, the push button having one end coupled to the torsion spring, the pushbutton movable axially by compressing the torsion spring, the pushbutton rotationally fixed relative to the body member, an engagement member on the pushbutton, the engagement member engaged with a portion of the panel, the engagement member disengaged from the panel upon depressing the pushbutton against the torsion spring.

6. A wireless communication device, comprising:

a body member;

a panel pivotally coupled to the body member, the panel having opened and closed positions relative to the body member;

a torsion spring coupled to the body member and to the panel, the torsion spring having higher energy when the panel is in the closed position, the torsion spring having lower energy when the panel is in the opened position;

a spring-biased cam and follower assembly, a cam of the spring-biased cam and follower assembly coupled to one of the body member or the panel, a follower of the spring-biased cam and follower assembly coupled to the other of the panel or the body member to which the cam is not coupled, the cam having an increasing slope and a decreasing slope, the follower coupled with the increasing slope of the cam when the torsion spring has higher energy, the follower coupled with the decreasing slope of the cam when the torsion spring has lower energy.

7. The device of claim 6, a push button disposed axially through compression spring, the push button having one end coupled to the torsion spring, the pushbutton movable axially by compressing the torsion spring, the pushbutton rotationally fixed relative to the body member, an engagement member on the pushbutton, the engagement member engaged with a portion of the panel, the engagement member disengaged from the panel upon depressing the pushbutton against the torsion spring.

8. A wireless communication device, comprising:

a body member;

a panel pivotally coupled to the body member, the panel having opened and closed positions relative to the body member;

a torsion spring coupled to the body member and to the panel, a spring-biased cam and follower assembly, a cam of the spring-biased cam and follower assembly coupled to one of the body member or the panel a follower of the spring-biased cam and follower assembly coupled to the other of the panel or the body member to which the cam is not coupled;

a pushbutton rotationally fixed to the body member, an end of the torsion spring coupled to the panel, another end of the torsion spring coupled to the pushbutton, the pushbutton movable axially by compressing the torsion spring, an engagement member on the pushbutton engaged with the panel the engagement member disengaged from the panel upon depressing the pushbutton against the torsion spring.

9. The device of claim 8, the pushbutton disposed axially through a compression spring of the spring-biased cam and follower assembly and through the cam and follower, the pushbutton rotationally fixed to the body member by the cam or the follower coupled to the body member, the pushbutton rotatably disposed through the cam or the follower coupled to the panel.

10. The device of claim 9, a resilient member disposed between the one of the cam or the follower rotationally fixed to the pushbutton and the panel, the resilient member aligned axially with the compression spring.

11. A wireless communication device, comprising:

a body member;

a panel pivotally coupled to the body member;

a resilient member disposed between a portion of the body member and a portion of the panel;

a spring disposed in compression between the body member and the panel, the spring urging the portion of the body member and the portion of the panel between which the resilient member is disposed toward each other, whereby the resilient member is decreasingly compressed between the portion of the body member and the portion of the panel as the panel is moved from a closed position to an opened position.

12. The device of claim 11, a cam coupled to one of the body member or the panel;

a follower coupled to the one of the body member or the panel to which the cam is not coupled;

the spring is disposed between one of the body member and the panel and one of the cam or the follower, the cam and the follower biased into engagement by the spring.

13. The device of claim 12, a torsion spring having a portion coupled to the body member, the torsion spring having another portion coupled to the panel, the torsion spring having an axis aligned substantially with an axis of the compression spring.

14. The device of claim 13, spring biasing member rotatably coupled to one of the body member or the panel, the spring biasing member interconnecting the torsion spring and the body member, a rotation axis of the spring biasing member substantially parallel with an axis of the torsion spring, the rotation axis of the spring biasing member not aligned with the axis of the torsion spring.

15. The device of claim 13,
a push button disposed axially through compression spring,
the push button having one end coupled to the torsion spring, the pushbutton movable axially by compressing the torsion spring, the pushbutton rotationally fixed to the one of the cam or the follower coupled to the body member,
an engagement member on the pushbutton, the engagement member engaged with the cam or the follower to which the pushbutton is not rotationally fixed, the engagement member disengaged from the cam or from the follower to which the pushbutton is not rotationally fixed upon depressing the pushbutton against the torsion spring.

16. A wireless communication device comprising:
a body member having a panel pivotally coupled thereto by a hinge;
a spring biasing member rotatably coupled to one of the panel or the body member;
a torsion spring having a portion coupled to the spring biasing member, the torsion spring having another portion coupled to the body member or to the panel to which the spring biasing member is not coupled,
a rotation axis of the spring biasing member substantially parallel to an axis of the torsion spring, the rotation axis of the spring biasing member not aligned with the axis of the torsion spring.

17. A wireless communication device, comprising;
a body member;
a panel pivotally coupled to the body member;
a cam coupled to one of the body member or the panel;
a follower coupled to the one of the body member or the panel to which the cam is not coupled;
a spring biasing member having a threaded shaft rotatably coupled to one of the body member or the panel;
a compression spring having one end coupled to one of the cam or the follower, the compression spring having another end coupled to the spring biasing member,
an axis of the compression spring substantially parallel with an axis of the threaded shaft,
whereby follower is adjustably biased into engagement with the cam by rotating the spring biasing member.

18. A method in a wireless communication device having a panel hinged to a body member, comprising:
pivoting the panel from a first position to a second position by imparting torque to the panel with a torsion spring coupled to the panel and to the body member,
dampening pivotal motion of the panel by imparting a counter-torque to the panel with a spring biased cain follower assembly coupled to the body member and to the panel when energy in the torsion spring is more.

19. The method of claim 18, pivoting the panel by imparting a torque to the panel with the spring biased cam follower assembly when energy in the torsion spring is less.

20. The method of claim 19, imparting the counter-torque to the panel with the spring biased cam follower assembly by moving a follower along a cam surface having an increasing slope, and imparting the torque to the panel with the spring biased cam follower assembly by moving a follower along a cam surface having a decreasing slope.

21. A method in an apparatus having a panel coupled to a body member by a spring-biased hinge, useable in wireless communications devices, comprising:
rotating the panel relative to the body member by applying a torque to the panel;
rotating the panel at a relatively constant speed by regulating a rotation rate of the panel,
regulating the rotation rate of the panel by decreasingly dampening the torque applied to the panel with increasing angular rotation of the panel.

22. The method of claim 21, decreasingly dampening the torque applied to the panel by decreasingly compressing a friction generating resilient member compressed between portions of the panel and body member with increasing angular rotation of the panel.

23. The method of claim 21, regulating the rotation rate of the panel by decreasingly decreasing the torque applied to the panel with increasing angular rotation of the panel at least during a portion of angular rotation, regulating the rotation rate of the panel by increasingly increasing the torque applied to the panel with increasing angular rotation of the panel at least during another portion of angular rotation.

24. A method in an apparatus having a panel coupled to a body member by a spring-biased hinge, useable in a wireless communication device having a panel hinged to a body member, comprising:
rotating the panel relative to the body member by urging a cam coupled to one of the panel or the body member into engagement with a follower coupled to the other of the body member or the panel to which the cam is not coupled with a compression spring;
controlling rotation of the panel by moving the follower along surfaces of the cam having different slopes.

25. The method of claim 24, dampening rotation of the panel more when the compression spring is compressed more by moving the follower along a less steeply sloped cam surface, dampening rotation motion of the panel less when the compression spring is compressed less by moving the follower along a more steeply sloped cam surface.

26. A method in an apparatus having a panel coupled to a body member by a spring-biased hinge, useable in a wireless communication device, comprising:
rotating the panel relative to the body member between a closed position and an opened position;
decreasingly dampening rotation of the panel as the panel rotates from the closed position to the opened position.

27. The method of claim 26,
rotating the panel by urging a cam coupled to one of the panel or a body member into engagement with a follower coupled to the other of the body member or the panel to which the cam is not coupled with the compression spring;
dampening rotation of the panel by compressing a resilient member disposed between the body member and the panel with the compression spring.

* * * * *